United States Patent [19]
Bowers

[11] 4,162,774
[45] Jul. 31, 1979

[54] BELT DRIVE CARTRIDGE
[75] Inventor: George W. Bowers, Hayward, Calif.
[73] Assignee: Verbatim Corporation, Sunnyvale, Calif.
[21] Appl. No.: 842,542
[22] Filed: Oct. 17, 1977
[51] Int. Cl.² ............................................. G03B 1/04
[52] U.S. Cl. .................................... 242/192; 242/199
[58] Field of Search ............... 242/55.01, 75.3, 76, 242/187, 189, 192–199; 360/96, 132; 226/184, 191

[56] References Cited
U.S. PATENT DOCUMENTS

| | | | |
|---|---|---|---|
| 1,942,890 | 1/1934 | Wittel | 242/192 |
| 2,743,878 | 5/1956 | Masterson | 242/192 |
| 3,132,788 | 5/1964 | Johnson | 226/184 |
| 3,235,194 | 2/1966 | Willis | 242/192 |
| 3,380,678 | 4/1968 | Feasey et al. | 242/55.01 |
| 3,884,430 | 5/1975 | Martin | 242/199 |

*Primary Examiner*—Leonard D. Christian
*Attorney, Agent, or Firm*—Freilich, Hornbaker, Wasserman, Rosen & Fernandez

[57] ABSTRACT

A tape cartridge of the belt drive type, wherein an elastomeric member is coupled to the drive belt to be continually deformed by the drive belt, so that hysteresis energy losses in the elastic member create drag on the drive belt. In one cartridge, the belt guide rollers, about which the belt extends, have rubber-like cores. In a second cartridge, a thick rubber-like auxiliary belt extends around the belt guide rollers so that the auxiliary belt is driven by the drive belt as it rotates the guide rollers. In a third cartridge, a rubber-like auxiliary roller presses against a belt guide roller.

10 Claims, 7 Drawing Figures

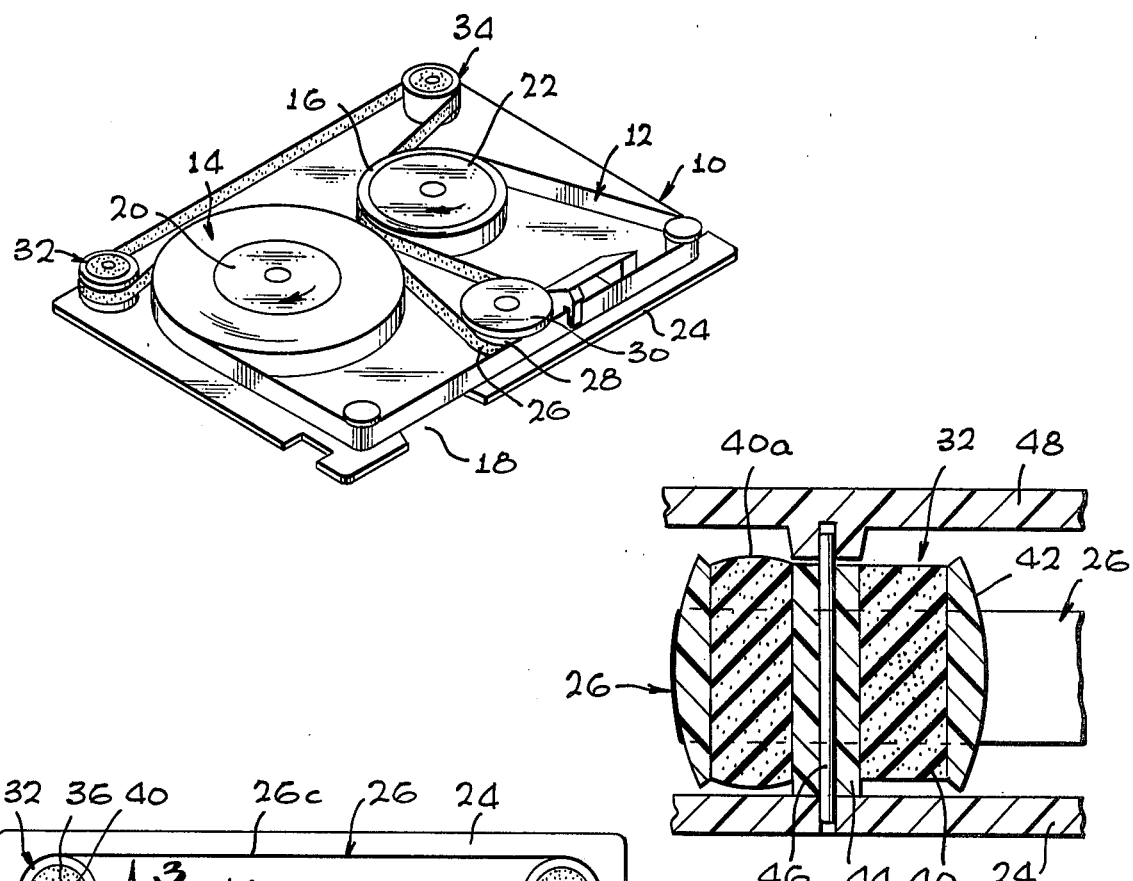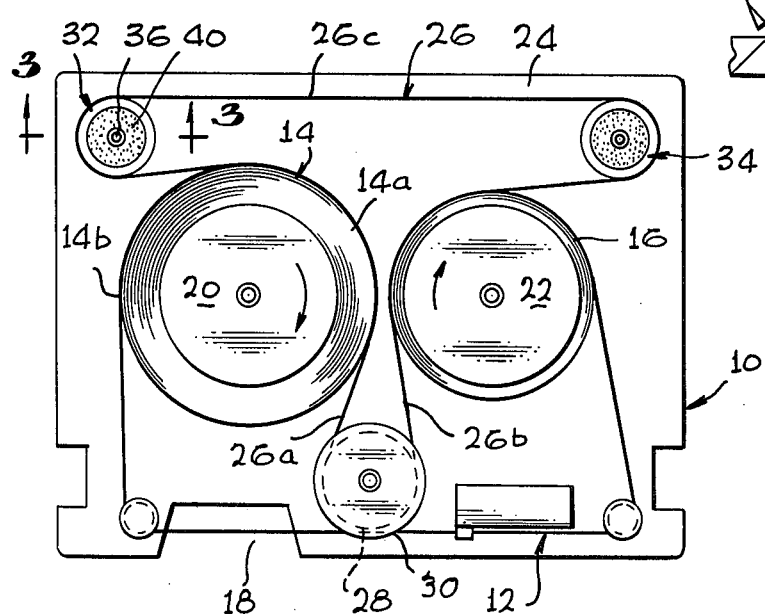

BELT DRIVE CARTRIDGE

BACKGROUND OF THE INVENTION

This invention relates to tape cartridges of the belt driven type.

One type of tape cartridge includes a tape whose ends form a supply roll of tape and a takeup roll of tape, and which is driven by a drive belt that bears against the two rolls of tape to turn them. The drive belt can extend around a driven roller and around a pair of corner guide rollers that hold the belt in a path wherein it presses against the tape rolls. It is known that drag applied to the drive belt produces a differential in belt tension which produces tension in the tape. Tape tension is produced, because tension in that portion of the belt that presses on the takeup toll, causes elongation of the belt and therefore causes the belt to move slightly faster so that it tends to drive the takeup roll slightly faster and create tension in the tape. The most common method of producing such belt drag, is to apply friction to the belt or to a guide roller about which the belt extends. For example, U.S. Pat. No. 3,692,255 by Von Behren describes a tape cartridge wherein drag on the belt is achieved by friction between the guide rollers and the shafts on which they rotate.

The use of friction to produce drag on the drive belt, such as by friction between a belt guide roller and the shaft on which it rotates, can result in large variations in belt drag and therefore in tape tension. This is because such friction is very difficult to control so as to remain close to a predetermined level. For example, the precise level of friction between a rotating roller and its shaft can be affected by microscopic particles lying on the shaft, the precise finish of the inside of the roller and of the shaft, and other factors that are extremely difficult to control. Oil on the shaft can help reduce variation in friction, but the variations are still large. The drag on the belt also can be controlled by connecting a miniature electric generator to the guide rollers to retard them, but this adds considerably to the cost of the cartridge. A tape cartridge of simple design which enabled relatively close control of drive belt drag would enable the production of tape cartridges having more closely controlled characteristics, which is especially useful for data recording but is also useful in voice and music applications.

SUMMARY OF THE INVENTION

In accordance with one embodiment of the present invention, a relatively simple belt drive cartridge is provided which produces a relatively predictable and uniform tape tension. The cartridge is of the type which includes a drive belt that extends against the pair of tape rolls and around a drive roller that drives the belt and at least one guide roller that guides the belt. The cartridge also includes a drag means that includes an elastomeric member which is deformed at changing regions as the guide roller turns during movement of the drive belt, to produce a hysteresis energy loss and therefore a drag on the belt which, in turn, results in tension in the tape.

In one cartridge, the drag means comprises a core of rubber-like material forming part of a guide roller. The elastomeric core is deformed by the force of the tensioned drive belt against the guide roller. In another tape cartridge, an auxiliary belt of rubber-like material is provided which extends about a pair of guide rollers, so that the auxiliary belt is turned as the drive belt moves. In still another cartridge, an auxiliary roller of rubber-like material is biased towards a guide roller. In these cartridges, an elastomeric member is deformed by power applied by the drive belt, and the hysteresis characteristics of the elastomeric member results in hysteresis energy losses that produce a controllable amount of drag on the drive belt.

The novel features of the invention are set forth with particularity in the appended claims. The invention will be best understood from the following description when read in conjunction with the accompanying drawings.

BRIEF DESCRIPTION OF THE DRAWINGS

FIG. 1 is a perspective view of a tape cartridge constructed in accordance with one embodiment of the invention, with the upper housing removed.

FIG. 2 is a plan view of the cartridge of FIG. 1.

FIG. 3 is an enlarged view taken on the line 3—3 of FIG. 2.

DESCRIPTION OF THE PREFERRED EMBODIMENTS

Figure 4:
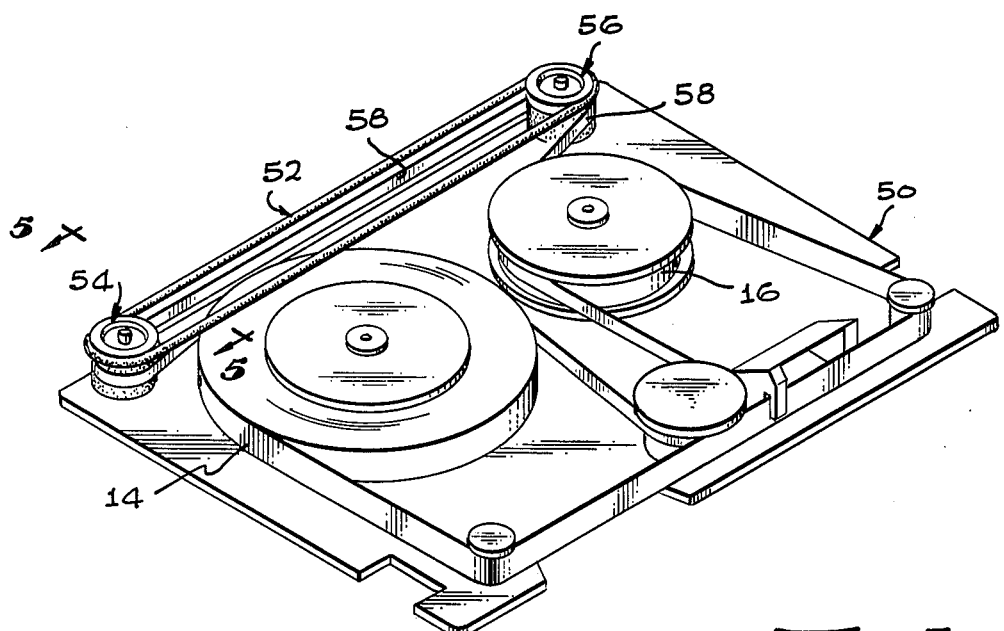
FIG. 4 is a perspective view of a tape cartridge constructed in accordance with another embodiment of the invention, with the upper housing removed.

FIGS. 1-3 illustrate a tape cartridge 10 constructed in accordance with the present invention, which includes a tape 12 that moves along a predetermined path between a pair of tape packs or rolls 14, 16, past a location 18 where a read/write head can be positioned. The tape rolls are held on a pair of reels 20, 22 that are rotatably mounted about fixed axes on a base plate 24. The tape is driven by a drive belt 26 that extends around a portion 28 of a drive roller 30 that is designed to be driven by a motor driven friction drive, and about a pair of guide or corner rollers 32, 34.

The drive belt 26 serves not only to engage the tape rolls 14, 16 to turn them and move tape from one roll to the other, but also serves to maintain tension in the tape 12 which is passing the region 18, such tension being necessary to hold the tape against a read/write head to assure reliable data transfer. Such tape tension has heretofoe typically been produced by utilizing a belt 26 of thick elastic materials such as rubber, which could be easily elongated. During rotation of the tape rolls in the indicated directions, there would be a greater tension in the belt portion 26a bearing against the takeup roll 14 than in the belt portion 26b bearing against the supply roll 16. The larger tension in belt portion 26a caused it to elongate slightly, which tended to rotate the periphery of the takeup roll 14 slightly faster than the supply roll, to thereby maintain tension in the tape. The maintenance of a higher tension in one drive belt portion 26a than the other, necessitated that a level of drag be applied to the belt in the region 26c where the belt extended from one tape roll 14 to the other 16, which is the belt portion opposite the drive roller 30. A very simple way of producing such drag is to maintain friction between the shaft 36 of each guide roller and the rest of the guide roller which rotates about the shaft. Such friction is very hard to maintain at a predetermined relatively constant level, so that the tape tension varied within wide limits. It also may be noted that the elastic drive belt 26 was also useful in permitting slight changes in belt length, on the order of one percent, which occurred as tape moved from one tape roll to the other.

In accordance with the present invention, drag on the drive belt portion 26c is achieved by the use of an elastomeric member which is deformed as the tape passes the guide rollers, and with the hysteresis energy losses of the elastic member providing the necessary drag. In the embodiment of the invention shown in FIGS. 1-3, each guide roller such as 32, includes a core 40 of elastomeric material such as a medium to soft rubber or silicone plastic. The roller also includes a peripheral portion 42 of substantially rigid material such as Delrin surrounding the elastomeric core to directly engage the tape 26. A hub portion 44 lies within the core 40, and a shaft 46 rotatably supports the hub portion 44. The shaft 44 is mounted in a hole formed in the base plate 24 of the cartridge, and lies under an upper housing 48 of the cartridge.

The force of the tensioned drive belt 26 on the roller, causes one portion 40a of the core to be compressed. As the roller 32 rotates, changing regions of the elastomeric core are deformed. The elastomeric material is not perfectly resilient, but instead has hysteresis losses. Thus, the compression and relaxation of the elastomeric core produces hysteresis-caused energy losses that are turned into a slight amount of heat. These energy losses result in resistance to turning of the guide rollers, and therefore drag on the drive belt 26. The hysteresis losses are fairly well predictable and are also controllable, as by the selection of a particular elastomeric material and the thickness of the core. The amount of drag is much more predictable than is normally the case in friction-based drag.

The elastic core 40 of the roller not only produces drag on the drive belt, but can also serve to change the required length of path of the drive belt, so that the drive belt does not have to be highly elastic. Thus, the drive belt 26 can be constructed of a flexible but relatively inelastic material such as Mylar. Such a relatively inelastic belt is utilized with a moderately high belt tension, with the belt tension being maintained by the resilient guide rollers. As the tape winds from one reel to the other, so that the belt would normally have to elongate slightly, the elastic cores 40 of the guide rollers will be compressed instead of necessitating elongation of the drive belt.

The use of a stiffer belt has the advantage that it permits more rapid acceleration and deceleration of the belt and therefore of the tape. This is of considerable importance for intermittant data recording applications, where the length of time required to accelerate the tape to full speed determines the size of memory required to hold the data to be recorded and the length of tape which is wasted before recording beings. It may be noted that the elastomeric material could be extended to the belt-engaging periphery of the roller, except that direct belt to rubber contact would produce unwanted debris. Thus, the cartridge of FIGS. 1-3 achieves the dual advantage of providing a more constant and predictable tape tension and permitting the use of a less elastic belt for higher performance, all in a mechanism of relatively simple and low cost construction.

Figure 5:
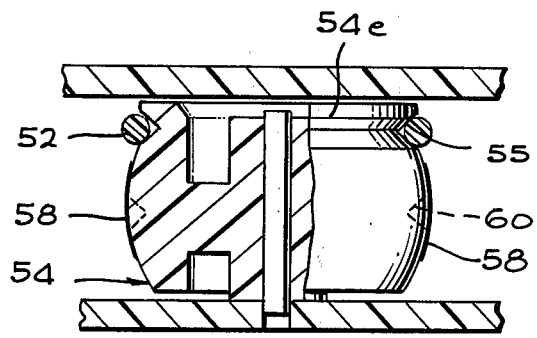
FIG. 5 is a view taken on the line 5—5 of FIG. 4.

FIGS. 4 and 5 illustrate another tape cartridge 50 which utilizes the hysteresis and energy losses resulting from the deformation of an elastic or elastomeric material to produce drag on a drive belt for generating a predictable level of tape tension. The cartridge is largely similar to that of FIG. 1, except that it includes an auxiliary belt 52 and can utilize plastic corner guide rollers 54, 56 without elastic cores. The auxiliary belt 52 is thick and constructed of elastomeric material such as a soft vinyl plastic, so that it experiences a significant hysteresis loss when rotating about the guide rollers. As a result, as the drive belt 58 is moved, and turns the guide rollers 54, 56, the guide rollers, in turn, move the auxiliary belt 52. The auxiliary belt resists such movement, and therefore generates a hysteresis-based drag to the drive belt. As in the case of the roller of FIGS. 1-3, the energy loss resulting from the hysteresis-characteristics of the elastomeric auxiliary belt, produces a predictable and relatively constant level of drag to the drive belt.

Each of the corner rollers such as 54 (FIG. 5), can be constructed with an end portion 54e having a groove 55 designed to engage the auxiliary belt 52, so that the auxiliary belt is spaced from the drive belt 58 and does not interfere with it. The auxiliary belt 52 can be constructed with a circular cross-section, to provide a belt of considerable thickness which can be produced at low cost. The fact that the auxiliary belt 52 lies at one axial end of the guide rollers, means that this belt can extend over the tape rolls 14, 16, to enable the construction of a compact tape cartridge. Where a larger tape cartridge can be utilized, it is possible to locate the auxiliary belt 52 at the center of the drive rollers, as by forming a groove at 60 at the middle of the guide rollers around which the belt rotates. In such a case, it may be necessary to move the guide rollers further from the tape rolls 14, 16 to prevent the auxiliary belt from riding on the tape rolls.

Figure 6:
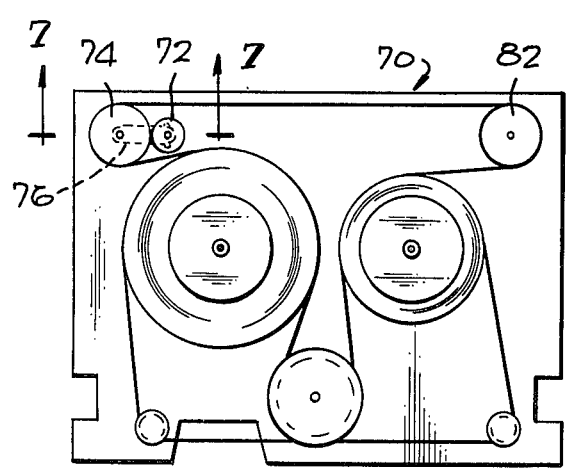
FIG. 6 is a plan view of a tape cartridge constructed in accordance with another embodiment of the invention, with the upper housing removed.
Figure 7:
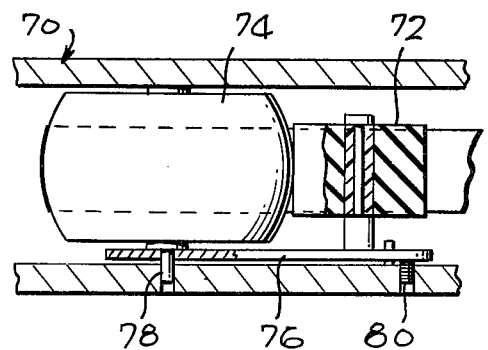
FIG. 7 is an enlarged view taken on the line 7—7 of FIG. 6.

FIGS. 6 and 7 illustrate a tape cartridge 70 constructed in accordance with another embodiment of the invention, wherein an auxiliary riding roller 72 is utilized to generate drag on one of the guide rollers 74. The auxiliary roller 72 is constructed of elastomeric material such as medium to soft rubber, and bears against the periphery of the guide roller 74. A simple mechanism for mounting the auxiliary roller and controllably pressing it against the guide roller 74, includes a sheet metal support 76 having one end captured by the shaft 78 of the guide roller and having another end which rotatably supports the auxiliary roller 72. A set screw 80 can be turned to press up the support 76 so as to press the auxiliary roller 72 closer to the guide roller 74 or allow it to retract slightly therefrom, to control the degree of deformation of the auxiliary roller and therefore the amount of drag it applies to the guide roller. If very compliant rubber is used, the shaft of the auxiliary roller can be fixed in position directly on the housing. Another elastomeric auxiliary roller similar to 72 can be mounted against the other guide roller 82. It is also possible to have the auxiliary roller bear against the side of a guide roller on which the drive belt lies, to press directly against the drive belt.

Another way to obtain belt drag is to simply make one guide roller of slightly larger diameter than the other at the locations thereof that engage an auxiliary belt. However, this can produce bidirectional characteristics, unless three guide rollers are used with the one of different diameter located between the other two, and in any case it results in some rubbing on the belt which could affect belt life and create more debris.

Thus, the invention provides tape cartridges of relatively simple design, which have an easily controllable and predictable level of belt drag and therefore of tape tension. In one embodiment of the invention, a guide roller or pair of guide rollers is constructed with an elastomeric core whose deformation produces hysteresis losses. This embodiment of the invention also facilitates the use of a relatively inelastic belt, since the core can also deform to slightly change the length of the belt path so as to compensate for the change that would occur as tape winds from one tape roll to the other. In another embodiment of the invention, an auxiliary elastic belt is utilized which extends around a pair of guide rollers to generate a hysteresis-based energy loss. In still another embodiment of the invention, an auxiliary elastic roller bears against a guide roller, so that deformation of the elastic auxiliary roller produces hysteresis-based energy losses and drag.

Although particular embodiments of the invention have been described and illustrated herein, it is recognized that modifications and variations may readily occur to those skilled in the art, and consequently, it is intended that the claims be interpreted to cover such modifications and equivalents.

We claim:

1. A belt drive tape cartridge comprising:
a tape with end portions formed in a pair of rolls;
a drive roller;
drag means including at least one guide roller; and
a belt extending about said drive roller and guide roller, and against said tape rolls;
said drag means including a rotating elastomeric member which is deformed at changing regions as the guide roller turns, whereby to produce a hysteresis energy loss and therefore drag on the belt which, in turn, produces tape tension.

2. The cartridge described in claim 1 wherein:
said guide roller includes a portion of elastomeric material between the axis and periphery of the roller, which is compressed by sideward force on the roller resulting from tension in said belt.

3. The cartridge described in claim 1 wherein:
said drag means includes a second guide roller and an auxiliary elastomeric belt extending around said guide rollers.

4. A belt drive tape cartridge comprising:
a pair of tape rolls;
a drive roller;
a pair of guide rollers; and
a drive belt extending about said drive roller and guide rollers, and against said tape rolls;
at least one of said guide rollers having at least a portion formed of elastomeric material which is compressed by the force of said drive belt against the guide roller.

5. In a belt drive tape cartridge which includes a pair of tape rolls, a drive roller, a pair of belt guide rollers, and a drive belt extending about said drive roller, against said tape rolls, and about said guide rollers, the improvement wherein:
each of said belt guide rollers includes a peripheral portion for engaging said belt and an inner portion which is spaced radially within said peripheral portion, and which is formed of elastomeric material.

6. The improvement described in claim 5 wherein:
said belt is substantially inelastic and the inner portion of said guide rollers is thick and elastic enough to deform sufficiently to compensate for a majority of the change of the belt path which otherwise would occur between the time when substantially half of the tape is on each roll and the time when substantially all of the tape is on one roll.

7. A drive belt cartridge comprising:
a pair of tape rolls;
a drive roller;
a pair of guide rollers;
a drive belt extending about said drive roller and guide rollers, and against said tape rolls; and
an auxiliary belt of elastomeric material extending between and about said guide rollers but not said drive roller, whereby to provide reliable hysteresis based drag to the drive belt and therefore to the tape.

8. The cartridge described in claim 7 wherein:
each guide roller has a middle main peripheral surface engaged with said drive belt, and a circumferential groove near one axial end engaged with said auxiliary belt.

9. A belt drive tape cartridge comprising:
a tape with end portions formed in a pair of rolls;
a drive roller;
at least one guide roller;
a belt extending about said drive roller and guide roller, and against said tape rolls; and
a riding roller having a peripheral portion of elastomeric material bearing against said guide roller, whereby to produce a hysteresis energy loss and therefore drag on the belt which, in turn, produces tape tension.

10. A belt drive tape cartridge comprising:
a pair of tape rolls;
a drive roller;
a pair of guide rollers; and
a drive belt extending about said drive roller and guide rollers, and against said tape rolls;
at least one of said guide rollers including a core of elastomeric material and a peripheral portion of substantially rigid material surrounding said core and engaging said belt.

* * * * *